United States Patent [19]
Alsup
[11] 3,889,065
[45] June 10, 1975

[54] ACOUSTIC DEVICES FOR TIME-MULTIPLEXED COMMUNICATION

[75] Inventor: James M. Alsup, San Diego, Calif.
[73] Assignee: The United States of America as represented by the Secretary of the Navy, Washington, D.C.

[22] Filed: July 1, 1974
[21] Appl. No.: 484,490

[52] U.S. Cl. .......... 179/15 BC; 178/22; 179/1.5 R; 179/15 A; 333/30 R; 333/30 R;70 T;71;72
[51] Int. Cl. .......... H04k 1/10
[58] Field of Search .......... 179/15 BC, 1.5 R, 1.5 S, 179/15 A; 178/22, 99

[56] References Cited

UNITED STATES PATENTS

| | | | |
|---|---|---|---|
| 3,551,837 | 12/1970 | Speiser | 333/30 R |
| 3,723,916 | 3/1973 | Speiser | 333/30 R |
| 3,833,867 | 9/1974 | Solie | 333/30 R |

*Primary Examiner*—David L. Stewart
*Attorney, Agent, or Firm*—Richard S. Sciascia; Ervin F. Johnston; John Stan

[57] ABSTRACT

A transmitter for time-multiplexed communication, utilizing complementary non-interacting codes, comprising: an acoustic surface-wave device, which provides two parallel signal propagation paths on its surface; a first signal source for generating an intermittent stream of pulses; a second signal source for generating a stream of pulses in the intervals of time when the first signal source is not generating a stream of pulses; a signal source switch; a multiplexing double-pole, double throw switch, for alternately switching a pair of output signals from the acoustic surface wave device between two transmit channels; a timing and control apparatus connected to the first and second signal sources and to the signal source and multiplexing switches, which controls (1) the time periods, or intervals, during which the first and second signal sources are alternately energized, and (2) the switching of the arms of the switches from one position to the other in synchronism with the alternate energization of the signal sources; with the result that a stream of intermittent pulses from the signal sources becomes a more or less continuous pair of signals. The first of which is sent over one transmit channel and then the other transmit channel, as determined by the timing control, while the second is sent on the two transmit channels in alternate order, the streams of output signals concealing coded information.

A receiver for time-multiplexed communication, having similar components, is also described.

6 Claims, 5 Drawing Figures

TRANSMITTER FOR THE GENERATION OF TWO MULTIPLEXED ENCODED SIGNALS.

ACOUSTIC SURFACE-WAVE DEVICE FOR TWO-SIGNAL MULTIPLEXING UTILIZING ONE PAIR OF COMPLEMENTARY SEQUENCE TRANSDUCERS ($T_A$ AND $T_B$).

RECEIVER FOR TWO ENCODED SIGNALS, EITHER/OR MODE.

RECEIVER FOR TWO MULTIPLEXED ENCODED SIGNALS, MULTIPLEXED OUTPUT MODE.

TRANSMITTER FOR THE GENERATION OF TWO MULTIPLEXED ENCODED SIGNALS.

TRANSMITTER FOR THE GENERATION OF TWO MULTIPLEXED ENCODED SIGNALS, ALTERNATE VERSION

ACOUSTIC DEVICES FOR TIME-MULTIPLEXED COMMUNICATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to improved, acoustic devices for time-multiplexed communication or ranging with complementary non-interacting codes. The invention describes means for using a single pair of electrode structures to serve as a generator of or matched filter for two non-interacting pairs of Golay complementary sequences.

Prior art methods for implementing generators or matched filters for a number of Golay pairs exceeding one required as many pairs of electrode structures (or more) as pairs of sequences.

The implementation herein disclosed reduces the complexity of electrode fabrication by two, with related gains in size, ease of manufacture, and simplicity. The only offsetting factors are a slight reduction in available data rate and a slight increase in signal switching operations.

For background information on this invention and on the prior art, reference is directed to the article entitled "Surface Wave Transducer Array Design Using Transversal Filter Concepts," by J. M. Speiser and H. J. Whitehouse, in the book entitled *Acoustic Surface Wave and Acousto-Optic Devices*, edited by T. Kallard, Optosonic Press, NYC, NY, 1971, and to U.S. Pat. No. 3,723,916, "Surface Wave Multiplex Transducer Device With Gain and Sidelobe Supression," to J. M. Speiser, et al., which isssued on Mar. 27 1973.

SUMMARY OF THE INVENTION

A single, matched-filter pair is used to encode or decode two independent, time-multiplexed signals. The matched-filter pair consists of a dual-channel acoustic delay line such that one channel has a distributed tapping structure $T_A$ which represents Code A, of a coded complementary pair, while the second channel has a similar tapping structure $T_B$ representing Code B, of the same coded complementary pair. Single-tap transducers located at both ends of the multi-tap transducer structures are used to launch (or receive) acoustic signals to (or from) these structures.

In brief, the system operates as follows:

A group of pulses, generated by a signal source, corresponding to a desired message are fed into a pair of single-tap transducers. If each transducer, $T_A$ and $T_B$, has 16 sets of fingers, for example, each input pulse generates a pair of output signals each comprised of 16 pulses (or samples).

The signals are transmitted over the two channels, and then they are received and put into the two separate channels of the receiving matched filter, which is identical to the one in the transmitter except that the signals are put in from the other end, with respect to the single-tap transducers. Out of the receiver come a pair of autocorrelation functions which, when summed, comprise the stream of pulses originally entered into the transmitter, that is, the message.

The signal source may generate pulses so rapidly that the output signals corresponding to adjacent input pulses may overlap each other.

Now, if a second signal source is energized, the first signal source must be allowed to die out first, so that the signals generated by the two would not overlap.

The time spread between output signal pulses (or samples) is determined by the acoustic delay between transducer taps. An upper bound on the frequency of input pulses from a signal source is obtained by calculating the inverse of this intertap delay.

With respect to the sequencing of the two signal sources, one signal source could be energized for one second, then the second signal source for one second, and thereafter multiplexing in alternation.

Or a previously agreed upon scheme could be used whereby one signal source would be used most of the time, until two signals had to be sent simultaneously. The person receiving the signal generated by the first signal source could be advised that signals from the second signal source are about to be transmitted, or the manner in which the sequencing is to be done could be agreed upon in advance.

A matched-filter pair of the type described can be constructed using acoustic surface-wave techniques, acoustic torsional-wave magnetostrictive-wire techniques, or any means whereby signals can be propagated through the distributed tapping structures simultaneously in both directions.

The type of coding or decoding achieved is a convolutional superposition or extraction of adjacent pulses in the signal source. A description of a means for generating a pair of such time-multiplexed convolutionally-encoded signals using an acoustic surface-wave device follows. When the first signal source is activated, it drives single-tap transducers $T_1$ and $T_2$ at one end of the surface-wave device, with a train of pulses which propagate in a bandpass acoustic format towards the corresponding multi-tap transducers $T_A$ and $T_B$. The corresponding electrical output from transducer $T_A$ is transmitted over transmit channel No. 1, and that from transducer $T_B$ is transmitted over transmit channel No. 2.

When the second signal source is activated, it drives single-tap transducers $T_3$ and $T_4$ at the other end of the surface-wave device, with its train of pulses. In this case, the corresponding electrical output from transducer $T_A$ is transmitted over transmit channel No. 2, and that from transducer $T_B$ over transmit channel No. 1. If transducers $T_1$ and $T_2$ are "in phase," then transducers $T_3$ and $T_4$ should be of "opposite phase" (or vice versa) to achieve the non-interacting property. Signals are time-multiplexed so that convolutionally-encoded signals originating from the first signal do not overlap, in the time domain, the convolutionally-encoded signals originating from the second signal source.

Decoding is accomplished by the same or by an identical device (depending upon whether echo-ranging or communications is the application). The receiver for decoding can be operated in either of two modes: "either/or mode" selects either to decode the signal generated by the first signal source, or the signal generated by the second signal source; "multiplexed output mode" decodes both signals but does not perform demultiplexing.

The decoding is a direct result of the properties of complementary, non-interfering sequence pairs:

$$R_{AA} + R_{BB} = \delta\,(T) \text{ and } R_{AB^R} - R_{AB^R} = 0.$$

The term $R_{AA}$ designates the autocorrelation function of coding $A$; $R_{BB}$, the autocorrelation function of coding $B$; $R_{AB^R}$ is the cross-correlation function of coding $A$ and the reverse of coding $B$; while the term $R_{BA^R}$ is the cross-correlation function of coding $B$ and the reverse of coding $A$. The term $\delta\,(T)$ relates to the Dirac delta function.

The principle just illustrated can be extended to hold for a number $n$ of time-multiplexed signals, with the number of acoustic paths on the device and the number of propagation channels required also increasing, in steps of $2^m$, $n \leqq 2^m$. However, the real advantage of utilizing the bidirectional acoustic delay lines to implement two codes with a single mutli-tap transducer structure occurs when the number of signals to be multiplexed is exactly two.

A specific application for two-signal multiplexing is for pulse-code modulation (PCM) communication in which each sample of the signal to be communicated is represented in a serial-bit format. These bits are used to pulse (1) or not pulse (0) the input to the encoder, but a frame pulse every $k^{th}$ sample ($k$ an integer $> 1$) is always required. The frame pulse, then, may be the second signal source, and can be selected to appear at the receiver's output for initial synchronization, and after a suitable (short) interval, the receiver can be switched into the "multiplexed output mode."

OBJECTS OF THE INVENTION

An object of the invention is to provide a time-multiplexed communication which utilizes half as many electrode structures as prior art devices.

Another object of the invention is to provide a time-multiplexed communication which has much greater gain than similar prior art devices.

Yet another object of the invention is to provide a time-multiplexed communication which is much simpler in construction than prior art devices.

Other objects, advantages and novel features of the invention will become apparent from the following detailed description of the invention, when considered in conjunction with the accompanying drawings, wherein:

DESCRIPTION OF THE PREFERRED EMBODIMENTS

Figure 1:
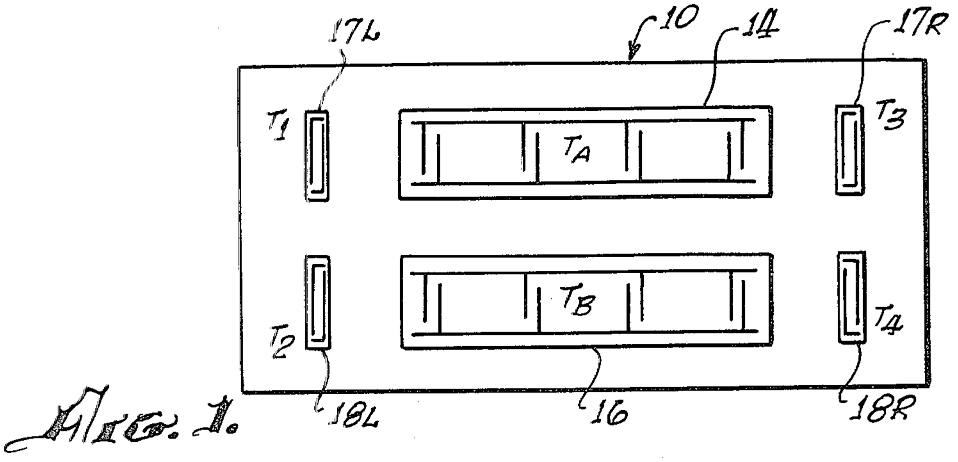
FIG. 1 is a diagrammatic view of an acoustic surface-wave device for two-signal multiplexing, utilizing one pair of transducers coded according to the two members of a complementary pair.

Referring now to FIG. 1, this figure illustrates an acoustic surface-wave device 10, which provides two parallel, horizontal, signal propagation paths on its surface, used in a transmitter for time-multiplexed communication, utilizing complementary non-interacting codes. The surface-wave device 10 comprises a substrate 12, capable of propagating acoustic surface waves. A pair of coded interdigited electrode structures, 14 and 16, are disposed upon the substrate 12, one structure in each of the propagation paths, one structure coded according to one member of a complementary pair, the other structure coded according to the other member of a complementary pair, each coded electrode structure transducing an acoustic wave propagating in its respective propagation path into an output electrical signal which may be transmitted externally off the substrate by means of output leads. For every electrical pulse impressed upon transducer 17L, a stream of pulses, corresponding to the coding A on transducer 14, is generated by transducer 14. A similar situation obtains with respect to transducer 18L and 16.

Alternatively, if $T_A$ and $T_B$ are used as input transducers, then the excitation of them by an electrical pulse results in a pair of acoustic signals representing the signals A and B propagating in the upper and lower channels, respectively, of surface wave device 10. When received by transducers 17L and 18L, respectively, these acoustic signals become electrical signals suitable for transmission over a pair of transmit channels.

Coded transducers 14 and 16, also designated as $T_A$ and $T_B$, are coded according to the two members A and B of a complementary series, a Golay complementary series, as illustrated.

Because the transducers 14 and 16 are shown for use in a narrow-band system, for example a five percent bandwidth, the coded electrodes do not require a field-delineating electrode interposed between the two electrodes shown. In a wideband system, for example 75% bandwidth, field-delineating electrodes would be required. These are described in an issued patent.

As mentioned hereinabove, electrodes configured according to complementary codes are involved in surface wave transducers 14 and 16. A specific complementary code from which useful results were obtained was a Golay complementary code. Useful background information on surface-wave devices in general and specifically on Golay codes may be obtained from U.S. Pat. No. 3,551,837, to J. Speiser, et al., which issued on Dec. 29, 1970 and is entitled "Surface Wave Transducers With Side Lobe Suppression."

Two pairs of individually uncoded interdigitated electrode structures, 17L, 17R and 18L, 18R are disposed upon the substrate 12, one pair in each of the two propagation paths on each side of the coded electrode structures, 14 and 16. For non-interacting code operation, one of these uncoded electrodes (17L, 17R, 18L, 18R) can be specified to have opposite carrier phase from the other three, resulting in the negation of the signal leaving or entering that electrode structure.

The acoustic surface-wave device 10 has the property that a single electrical pulse applied to an uncoded electrode structure 17L, 17R or 18L, 18R, results in a multiple-pulse (or multiple-sample) electrical output signal at the output leads or bus bars, of transducer 14 or 16.

Figure 2:
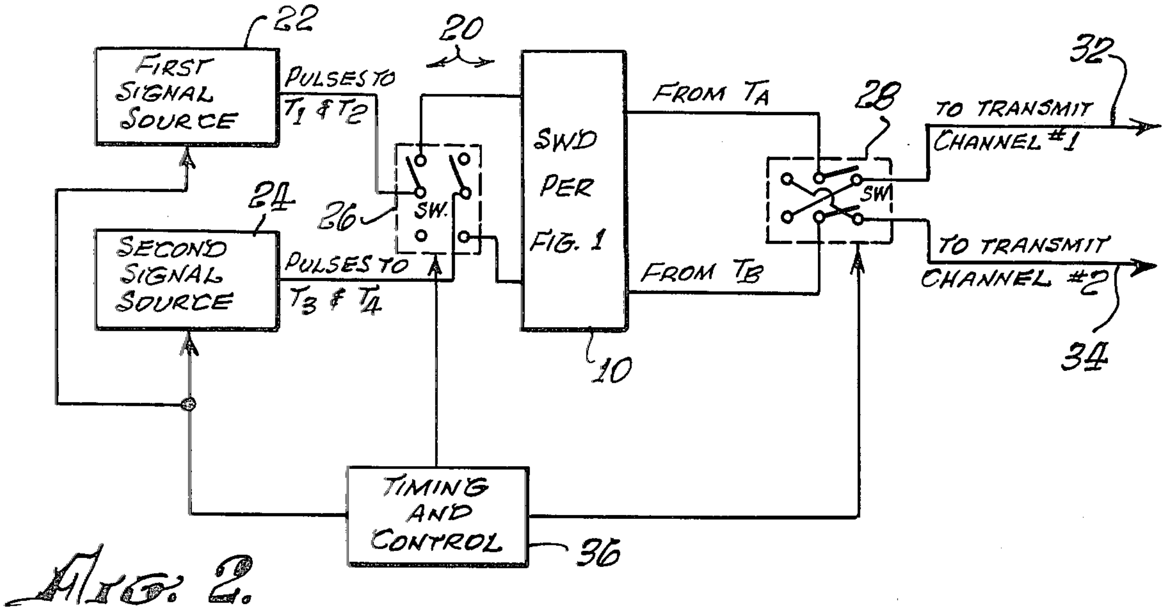
FIG. 2 is a schematic diagram of an implementation of a transmitter for the generation of two multiplexed encoded signals.

Referring now to FIG. 2, this figure shows a first signal source 22 for generating pulses, whose output is connected through a switch 26 to two of the uncoded electrode structures 17L and 18L, (FIG. 1), which are on the left side of the coded electrode structures, 14 and 16, respectively, the signal source generating a stream of input pulses.

A second signal source 24, also for generating input pulses, has its output connected, again through switch 26, to the other two uncoded electrode structures 17R and 18R, and generates a stream of input pulses in the intervals of time when the first signal source is not generating a stream of input pulses.

An input pulse from the first signal source 22 results in the transmission of a +A signal on transmit channel No. 1 and +B signal on transmit channel No. 2, whereas an input pulse from the second signal source 24 results in the transmission of a −B signal on transmit channel No. 1 and a +A signal on transmit channel No. 2, with the coding shown for transducers 17L, 17R, 18L, and 18R. One method of obtaining a signal −B from a signal +B is to invert the carrier, and one way to invert the carrier is to invert the polarity of transducer 18R, with respect to transducers 17L, 18L and 17R.

Signals generated by the first signal source 22 and the second signal source 24 comprise pulses, either coded or uncoded.

Assume that transducers 14 and 16 are coded, for example according to a 16-sample Golay code. For every pulse applied to either transducer 17L or 18L, there would be 16 code samples coming out of each coded transducer (14 and 16, respectively) for each code bit coming in.

If a next incoming code bit is applied after the 16 code samples have been produced at the output of the transducer 14 or 16, a time delay dependent upon the acoustic propagation time between first and last taps in the transducer 14 or 16, then there will not be an overlap in the two 16-sample sets.

If an input pulse appears before all 16 samples have been produced by the transducer structures, then some of the 16 output samples generated by the second input pulse will overlap the 16 output samples generated by the first input pulse. This is not only allowable, but is, in fact, desirable.

When these output samples enter a receiver, which will be described in connection with FIGS. 4 and 5, even though some may overlap, the receiver deconvolves" the two sets of samples, so that what comes out of the receiver is the original sequence of pulses which were emitted by the first or second signal source, 22 or 24, to excite the transmitter. Effectively, the samples which had overlapped, now no longer overlap, and are now resolved.

A typical application of the invention is in spread spectrum devices. The input sequence of pulses are spread out by the device so that they overlap each other, so that an unauthorized individual who is "listening" to the signal sees a group of samples which are all jumbled up, that is, would only see an indecipherable mixture of samples, and probably not even know that there is a coded signal in the mixture. A system such as this is sometimes called a "partially covert" system.

Referring back to FIG. 2, the transmitter 20 also comprises a multiplexing double-pole, double-throw switch 28 for alternately switching an output signal from each of the coded electrical structures 14 and 16, to each of two transmit channels, over leads 32 and 34. In FIG. 2, the leads designated from $T_A$ and from $T_B$ actually involve two wires, one connected to one of the top bus bars of electrode structure 14 and one connected to one of the bottom bus bars of electrode structure 16. One of the two leads would generally be connected to a neutral point.

A timing and control apparatus 36 is connected to the first and second signal sources 22 and 24, and to the signal source and multiplexing switches, 26 and 28. It controls (1) the time periods or intervals, during which the first and second signal sources 22 and 24, are alternately energized, and (2) the switching of the arms of the switches 26 and 28, from one position to the other in synchronism with the alternate energization of the signal source. It will be noted FIG. 2 shows one switch position for one source 22 of multiplex signal transmission, while for the other source 24 of signal transmission, the switch arms of switches 26 and 28 would both be reversed.

The result is that a stream of intermittent pulses from the signal sources 22 and 24 become a pair of more or less continuous streams of samples which are sent via two transmit channels, with channel exchange occurring at intervals determined by the timing control, the stream of output samples concealing coded information, if desired.

In transmitter 20, shown in FIG. 2, the pair of coded, interdigitated, electrode structures, 14 and 16 in FIG. 1, may be coded according to the two members of a Golay complementary pair.

Figure 3:
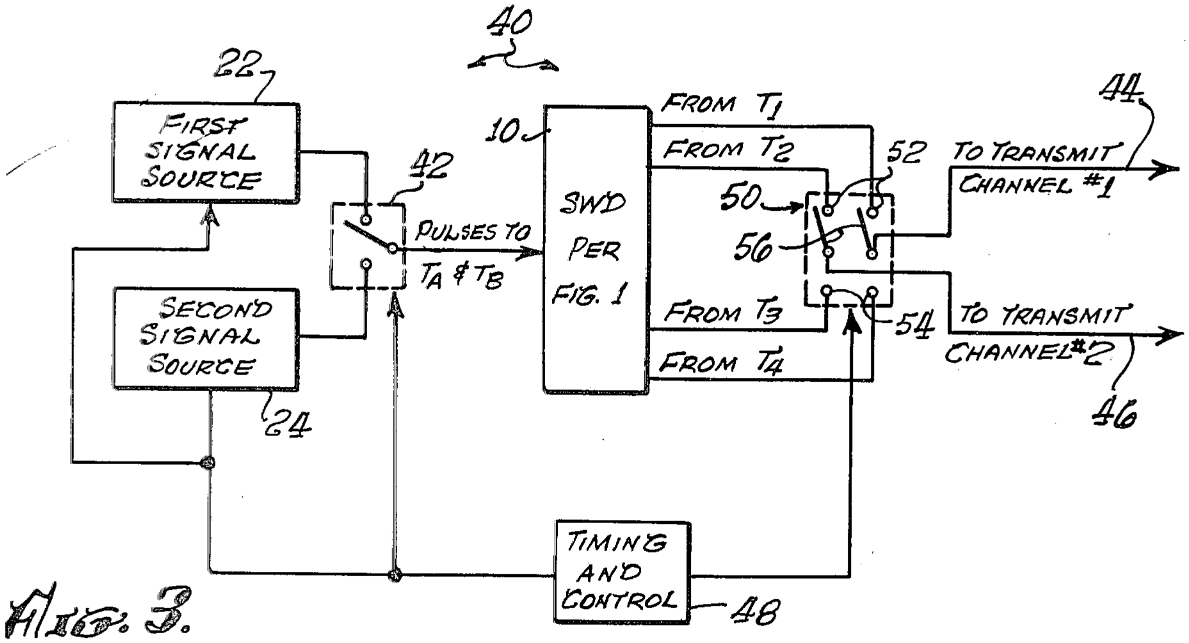
FIG. 3 is a schematic diagram, similar to FIG. 2, of an alternate version of an implementation of a transmitter for the generation of two multiplexed encoded signals.

Referring now to FIG. 3, this figure illustrates another embodiment of a transmitter 40 for time-multiplexed communication, utilizing complementary non-interacting codes, including the same type of an acoustic surface-wave device 10 as is shown in FIG. 1.

The transmitter 40 also includes a first signal source 22 for generating an intermittent stream of pulses and a second signal source 24 for generating pulses in the intervals of time when the first signal source is not generating a stream of pulses.

A signal source switch 42 has its terminals connected to the outputs of the first and second signal sources 22 and 24, its switch arm connected to each of the coded electrode structures, 14 and 16 in FIG. 1.

A multiplexing double-pole, double-throw switch 50, alternately switches an output signal from each pair of the uncoded electrode structures, 17L, 18L or 17R, 18R, in FIG. 1, to each of two transmit channels, over leads 44 and 46. The switch 50 comprises: one pair of terminals 52 connected to one of the pairs of uncoded electrode structures, 17L and 18L; the other pair of terminals 54 being connected to the other pair of uncoded electrode structures, 17R and 18R; with the two switch arms 56 being connected to the two transmit channels over leads 44 and 46.

In FIG. 3, for the position shown of the switch arm of switch 42, the switch arms 56 of switch 50 could be making contact with terminals 54, rather than terminals 52 as shown, and the transmitter 40 would still operate properly.

A timing and control apparatus 48 is connected to the first and second signal sources, 22 and 24, and to the signal source switch 50. The control 48 controls (1) the time periods or intervals, during which the first and second signal sources 22 and 24, are alternately energized; and (2) the switching of the arms 56 of the switch 50 from one position to the other, in synchronism with the alternate energization of the signal sources. The result is that a stream of intermittent pulses from the signal sources 22 and 24 becomes a pair of more or less continuous streams of samples which are sent via two transmit channels on leads 44 and 46, with channel exchange occurring at intervals determined by the timing control 48, the stream of output samples capable of concealing coded information.

Figure 4:
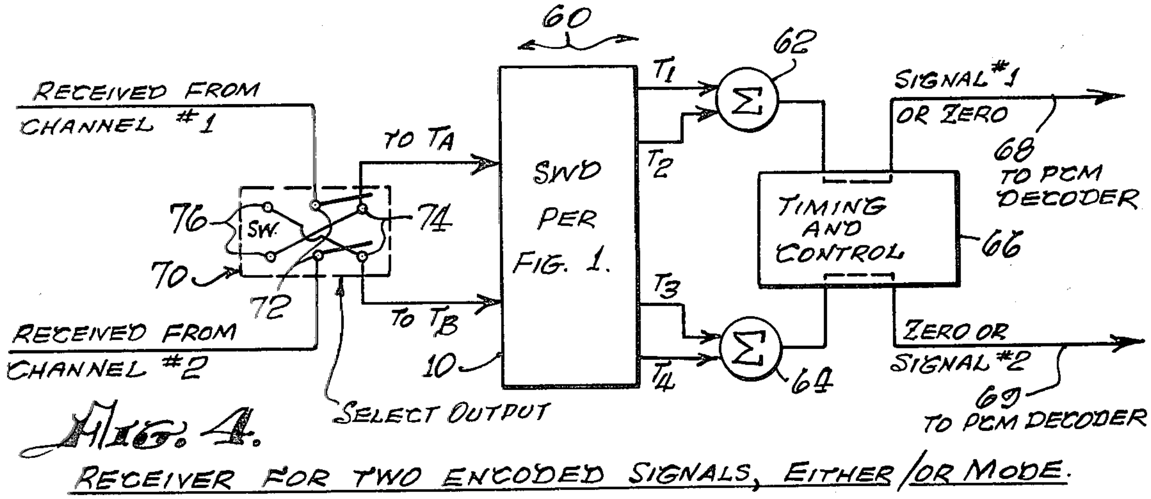
FIG. 4 is a schematic diagram of a receiver to be used with the transmitters, shown in FIGS. 2 and 3, of two encoded signals, not necessarily multiplexed, in an "either-or" mode.

Referring now to FIG. 4, this figure illustrates a receiver 60 for time-multiplexed communication, utilizing complementary non-interacting codes, comprising an acoustic surface-wave device, similar to the one labeled 10 in FIG. 1.

The receiver 60 also includes a received-signal switch 70, comprising: a pair of switch arms 72, each arm being connectable to a signal received from a first or second channel. One pair of terminals 74 is connected to the pair of coded electrode structures, 14 and 16 in FIG. 1, the other pair of terminals 76 being connected to the first-named pair 74 in criss-cross fashion, so that first one and then the other of the pair of coded electrode structures is connected to the first and then the second channel.

A first signal summer 62 has its two inputs connected to the outputs of two of the uncoded electrode structures, 17L and 18L which are on the left side of the coded electrode structures, 14 and 16. The output of the first signal summer 62 is a single pulse when proper autocorrelation functions are summed. A second signal summer 64 has its two inputs connected to the outputs of the other two uncoded electrode structures 17R and 18R, respectively. Its output also is a single pulse when proper autocorrelation functions are summed.

A timing and control apparatus 66, connected to the outputs of the first and second signal summers, 62 and 64, controls the time periods during which a signal from either the first or second channels may be detected. The timing and control apparatus 66 would generally only be used if it had been agreed upon in advance that the two signal sources 22 and 24 in FIGS. 2 and 3 would be energized at specific times and for specific intervals of time, for example at one-second intervals.

This alternate energization of the signal sources 22 and 24, could be done automatically. The timing and control apparatus 66 could include the means for recognizing a specific sequence of pulses whose purpose would be to actuate a switch which would permit listening in to signals sources 22 or 24 in the desired sequence. Or, a specific sequence of pulses could alert the listener to flip the switch 70 to the alternate position.

In FIG. 4, leads 68 and 69 would go to a special-type demodulator, for example to a pulse-code modulation (PCM) decoder.

As was the situation with the transmitter 20 shown in FIG. 2, in the receiver 60 shown in FIG. 4, the pair of coded, interdigitated, electrode structures may be coded according to the two members of a Golay complementary pair.

Figure 5:
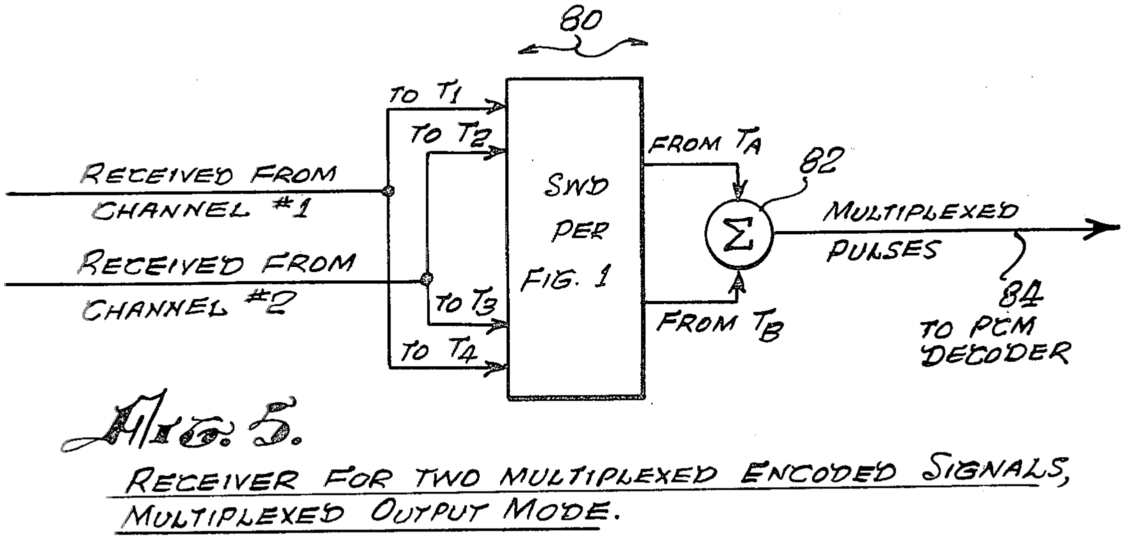
FIG. 5 is a schematic diagram of another type of receiver, which can be used also with the transmitters shown in FIGS. 2 and 3, in a "multiplexed output mode."

A transmitter-receiver used for time-multiplexed communication, may comprise a single surface-acoustic-wave device (FIG. 1) which can be reconfigured as a transmitter (FIG. 2 or FIG. 3) or as a receiver (FIG. 4 or FIG. 5).

To give a general description of the operation and capabilities of the transmitter-receiver combination, assume that one signal source is used to input a frame pulse every $k^{th}$ sample interval, and that the second signal source is used to input message pulses in a PCM format at other sample positions in the frame. When the transceiver at Location 1 is turned to transmit mode (as per FIG. 2 or FIG. 3) then the control circuitry automatically switches back and forth between signal sources 22 and 24 depending upon whether the frame pulse or one of the message pulses is to be inputed to the surface acoustic wave device 10. When the transceiver at Location 1 is listening to a similar message generated at some other location, it is turned to the receive mode (as per FIG. 4) so that it can lock onto the frame pulse an inputed by signal source 22. Then, with synchronization achieved, the receive mode can be changed automatically to the configuration of FIG. 5 so that the message is synchronously available for decoding.

One more scenario is described in order to demonstrate the flexibility of this invention: Assume that two transceiver units are operating at Locations 1 and 2, respectively, such that one is transmitting a message via signal source 22 and the other via signal source 24. In this case, they can even transmit over the same pair of channels simultaneously (no multiplexing required). A third party at Location No. 3 desires to listen in to the first signal source 22 of FIG. 2 (transmitted from Location No. 1). Referring back to FIG. 4, signal +A would be received at upper terminal 74 and signal +B would be received at lower terminal 74. The signal emitted by the first signal source 22 would be detected at lead 68 and a separate garbage signal (to be ignored) would be received at lead 69.

With the switch arms of switch 70 reversed, the signal emitted by the second signal source 24 of FIG. 2 (transmitted from Location No. 2) would now be detected on lead 69, and the signal on lead 68 would be ignored. In this instance, the signals +A and −B would be received.

Both the first and second signal sources, 22 and 24 of FIG. 2, can be transmitting simultaneously, and yet the receiver 60 shown in FIG. 4 could receive either signal, even if the two signal sources are at different locations. Only one signal source, 22 or 24 of FIG. 2, can be listened to at a time, depending upon the position of the switch arms of switch 70.

The first signal source 22 of FIG. 2 causes a signal to be transmitted, on leads 32 and 34, over transmit channels No. 1 and No. 2. The second signal source 34 of FIG. 2, which may be at a different location, also causes a signal to be transmitted over the same two channel frequencies, No. 1 and No. 2. It would be expected that the two transmitted signals would interfere with each other, but they do not. The receiver 60 of FIG. 4 will receive either the signal transmitted by the first signal source 22 or the second signal source 24, depending upon the position of the switch arms of switch 70.

Of course, the first and second signal sources 22 and 24, could be emitting signals at prearranged time intervals, so that only one signal source at a time would be transmitting signals. In this case, the configuration of FIG. 5 may be also used.

Referring now to FIG. 5, this figure illustrates another embodiment of a receiver 80 for time-multiplexed communication, also utilizing complementary non-interacting codes, including the acoustic surface-wave device 10 shown in FIG. 1.

A signal summer 82 has its two inputs connected to the outputs of the two coded electrode structures, 14 and 16 in FIG. 1, its output comprising multiplexed pulses.

Obviously, many modifications and variations of the present invention are possible in the light of the above teachings. It is therefore to be understood that within the scope of the appended claims the invention may be practiced otherwise than specifically described.

I claim:

1. A transmitter for time-multiplexed communication utilizing complementary non-interacting codes, comprising:
- an acoustic surface-wave device, which provides two parallel signal propagation paths on its surface, comprising;
  - a substrate, capable of propagating acoustic surface waves;
  - a pair of coded interdigitated electrode structures disposed upon the substrate, one structure in each of the propagation paths, one structure coded according to one member of a complementary pair, the other structure coded according to the other member of a complementary pair, each coded electrode structure transducing an acoustic wave propagating in its respective propagation path into an output electrical signal which may be transmitted externally of the substrate by means of output leads; and
  - two pairs of uncoded interdigitated electrode structures disposed upon the substrate, one pair in each of the two propagation paths on each side of the coded electrode structures;
  - the acoustic surface-wave device having the property that a single electrical pulse applied to the uncoded electrode structure results in a multiple-pulse (or multi-sample) electrical output signal at the output leads;
- a first signal source for generating pulses, whose output is connected to those two of the uncoded electrode structures which are on the same side of the coded electrode structures; one structure from each pair of uncoded electrode structures, the signal source generating a stream of pulses;
- a second signal source, also for generating pulses, whose output is connected to the other two uncoded electrode structures, the second signal source generating a stream of pulses in the intervals of time when the first signal source is not generating a stream of pulses;
- a signal source switch, whose input terminals are connected to the outputs of the first and second signal sources and whose output terminals are connected to, respectively, each pair of the uncoded electrode structures;
- a multiplexing double-pole double-throw switch, for alternately switching an output signal from each of the coded electrical structures to each of two transmit channels; and
- a timing and control apparatus connected to the first and second signal sources and to the signal source and multiplexing switches, which control (1) the time periods, or intervals, during which the first and second signal sources are alternately energized, and (2) the switching of the arms of the switches from one position to the other in synchronism with the alternate enegization of the signal sources;

with the result that a stream of intermittent pulses from the signal sources becomes a pair of more or less continuous streams of samples which are sent via two transmit channels, with channel exchange occurring at intervals determined by the timing control, the streams of output samples concealing coded information.

2. The transmitter according to claim 1, wherein the pair of coded, interdigitated, electrode structures are coded according to the two members of a Golay complementary pair.

3. A transmitter for time-multiplexed communication, utilizing complementary non-interacting codes, comprising:
- an acoustic surface-wave device, which provides two parallel signal propagation paths on its surface, comprising:
  - a substrate, capable of propagating acoustic surface waves;
  - a pair of coded interdigitated electrode structures, disposed upon the substrate, one structure in each of the propagation paths, one structure coded according to one member of a complementary pair, the other structure coded according to the other member of a complementary pair, each coded electrode structure transducing an electrical input pulse into a coded bandpass acoustic signal propagating in its respective propagation path towards an uncoded output electrode structure; and
  - two pairs of uncoded interdigitated electrode structures disposed upon the substrate, one pair in each of the two propagation paths on each side of the coded electrode structures;
- the acoustic surface-wave device having the property that a single electrical pulse applied to a coded electrode structure results in a multi-sample electrical output signal at the output leads;
- a first signal source for generating an intermittent stream of pulses;
- a second signal source for generating pulses in the intervals of time when the first signal source is not generating a stream of pulses;
- a signal source switch, whose terminals are connected to the outputs of the first and second signal sources and whose switch arm is connected to each of the coded electrode structures;
- a multiplexing double-pole double-throw switch, for alternately switching an output signal from each pair of the uncoded electrode structures to each of two transmit channels, the switch comprising:
- one pair of terminals, connected to one of the pairs of uncoded electrode structures;
- the other pair of terminals being connected to the other pair of uncoded electrode structures; and
- the two switch arms being connected to the two transmit channels; and
- a timing and control apparatus connected to the first and second signal sources and to the signal source switch, which controls (1) the time periods, or intervals, during which the first and second signal sources are alternately energized, and (2) the switching of the arms of the switch from one position to the other in synchronism with the alternate energization of the signal sources;

with the result that a stream of intermittent pulses from the signal sources becomes a pair of more or less continuous streams of samples which are sent via two transmit channels, with channel exchange occurring at intervals determined by the timing control, the stream of output samples concealing coded information.

4. A receiver for time-multiplexed communication, utilizing complementary non-interacting codes, comprising:

an acoustic surface-wave device, which provides two parallel signal propagation paths on its surface, comprising:

a pair of coded interdigitated electrode structures, disposed upon the substrate, one structure in each of the propagation paths, one structure coded according to one member of a complementary pair, the other structure coded according to the other member of a complementary pair, each coded electrode structure transducing an input electrical signal which may be received externally of the substrate by means of input leads into an acoustic wave propagating in its respective propagation path; and two pairs of uncoded interdigitated electrode structures disposed upon the substrate, one pair in each of the two propagation paths on each side of the coded electrode structures, the acoustic surface-wave device having the property that a particular pair of coded electrical signals applied to the two coded electrode structure results in a pair of autocorrelation-like electrical output signals at the output lead;

a received-signal switch, comprising:

a pair of switch arms, each arm being connectable to a signal received from a first or second channel;

one pair of terminals being connected to the pair of coded electrode structures;

the other pair of terminals being connected to the first-named pair in criss-cross fashion, so that first one and then the other of the pair of coded electrode structures is connected to the first and then the second channel;

a first signal summer, whose two inputs are connected to the outputs of two of the uncoded electrode structures which are on the same side of the coded electrode structures, one structure from each pair of uncoded electrode structures, and whose output is a single pulse when proper autocorrelation functions are summed;

a second signal summer, whose two inputs are connected to the outputs of the other two uncoded electrode structures, and whose output is also a single pulse when proper autocorrelation functions are summed; and a timing and control apparatus, connected to the outputs of the first and second signal summers, which controls the time periods during which a signal from either the first or second signal sources may be received.

5. The receiver according to claim 4, wherein the pair of coded, interdigitated, electrode structures are coded according to the two members of a Golay complementary pair.

6. A receiver for time-multiplexed communication, utilizing complementary non-interacting codes, comprising:

an acoustic surface-wave device, which provides two parallel signal propagation paths on its surface, comprising:

a substrate, capable of propagating acoustic surface waves;

a pair of coded interdigitated electrode structures, disposed upon the substrate, one structure in each of the propagation paths, one structure coded according to one member of a complementary pair, the other structure coded according to the other member of a complementary pair, each coded electrode structure transducing an acoustic wave propagating in its respective propagation path into an electrical signal which may be detected externally off the substrate by means of output leads; and two pairs of uncoded interdigitated electrode structures disposed upon the substrate, one pair in each of the two propagation paths on each side of the coded electrode structures;

the acoustic surface-wave device having the property that a particular pair of coded electrical signals applied to the uncoded electrode structure results in a pair of autocorrelation-like electrical output signals at the output leads; and a signal summer whose two inputs are connected to the outputs of the two coded electrode structures and whose output comprises multiplexed pulses.

* * * * *